Nov. 6, 1928.

F. R. KLAUS ET AL 1,690,823

CUSHION TIRE STRUCTURE

Filed May 19, 1924

Inventor
F. R. Klaus.
F. H. Meyer.
Lloyd L. Evans
Attorney

Patented Nov. 6, 1928.

1,690,823

UNITED STATES PATENT OFFICE.

FRED R. KLAUS AND FRANK H. MEYER, OF WARREN, OHIO, ASSIGNORS TO THE AMERICAN WELDING AND MANUFACTURING COMPANY, A CORPORATION OF OHIO.

CUSHION-TIRE STRUCTURE.

Application filed May 19, 1924. Serial No. 714,205.

This invention relates to tire structures and pertains more particularly to cushion tires of the type in which a tire with an inner recess or channel is molded and cured directly upon a tire base.

It is an object of the present invention to provide improvements in cushion tire structures carried by a base or rim which can be easily mounted upon the fixed rim of a wheel body or demounted therefrom, such type being commonly known as a demountable rim.

A further object of the invention is to provide a demountable cushion tire structure with a spacing ring which underlies a portion of the side rings and which may be expanded to form with the side rings or sections a relatively rigid rim which may be bodily mounted on or removed from the wheel.

With the above and other objects in view, the invention may be said to comprise the structure illustrated in the accompanying drawings, hereinafter described and particularly set forth in the appended claims, together with such variations and modifications thereof as will be apparent to those skilled in the art to which the invention appertains.

Reference should be had to the accompanying drawings forming a part of this specification in which.

Figure 1:
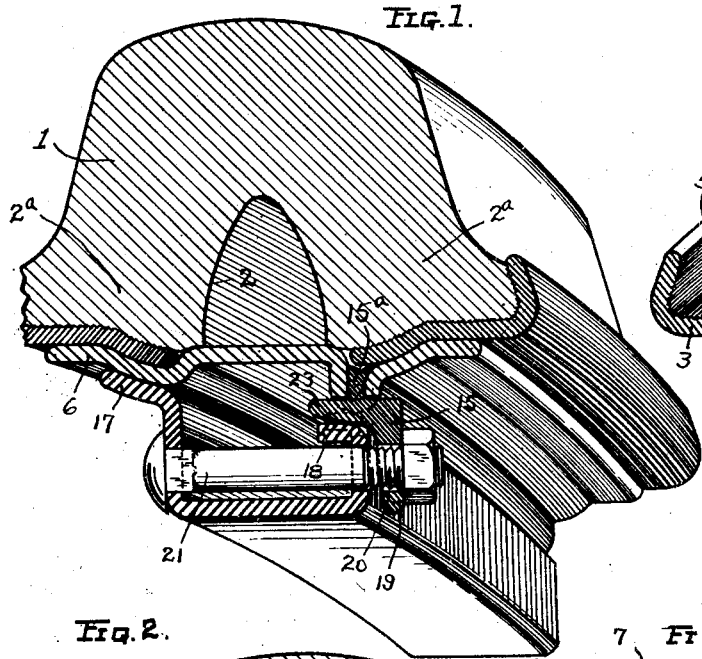
Figure 1 shows a transverse section through the tire rim and felly of the wheel and shows the means for detachably securing the rim on the felly.
Figure 4:
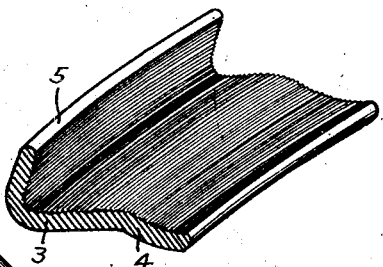
Figure 4 is a fragmentary perspective of a portion of one of the side rings.
Figure 5:
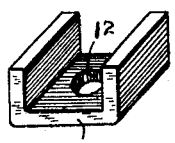
Figure 5 is a perspective view of the channel plate which bridges the split in the securing ring.

Referring to the drawings, a cushion tire 1 is shown in Figure 1, the tire being of arch-shaped construction and having a central recess 2 and legs 2ª, the latter being secured upon a pair of side sections or rings 3. Each of the rings 3 has a base portion 4 which preferably is of a gradually decreasing diameter toward its inner edge. The rings 3 are also provided with outer flanges 5 to engage the sides of the tire. The tire may be built up in the usual manner after a suitable core has been inserted between the side sections to form the recess 2 when the body is cured or vulcanized. As the space between the inner portions of the side sections is unobstructed, there is no difficulty in removing the core sections, which can be made in two or three, or any convenient number of sections.

Figure 3:
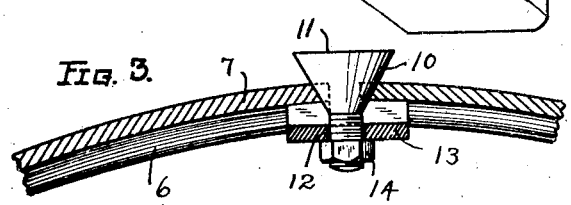
Figure 3 is a longitudinal section through the spacing ring at the meeting ends.

In order to secure the side sections together a supporting ring 6 is provided and this is formed preferably with a central raised portion 7 which engages between the adjacent edges of the side sections and thus spaces them apart. The ring 6 is also provided with outer portions 8 of gradually increasing diameter to underlie and engage the inner faces of the side sections. Preferably the supporting ring 6 is transversely split and expansible as indicated in Figure 3, so that the annular, central, raised portion 7 and the annular, outer portions 8 virtually form annular retaining grooves to receive the side sections 3 and interlock therewith. In order to assist in seating the cushion tire structure on a wheel felly, an annular depending channel portion 16 is preferably formed in the ring 6 and this may also receive clamps for securing the structure to a wheel as will more fully appear hereinafter.

Figures 2, 6:
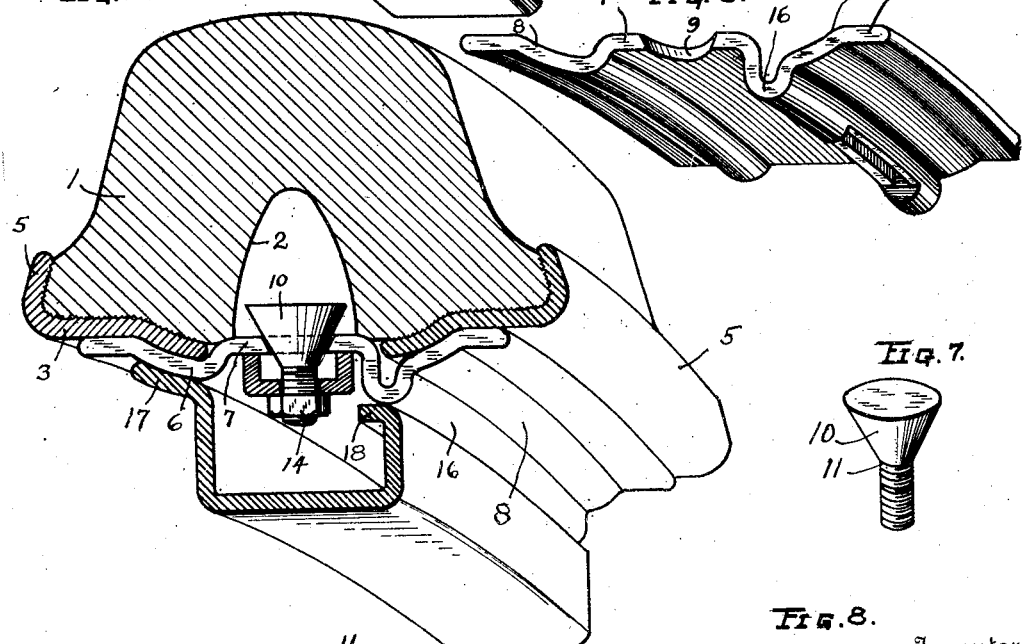
Figure 2 is a sectional view similar to Fig. 1 but taken at the split in the spacing ring.
Figure 6 is a fragmentary perspective view of the spacing ring.
Figure 7:
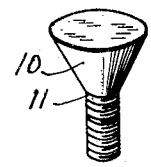
Fig. 7 is a view in perspective of an expanding bolt used in connection with the spacing ring.

As shown in Figures 3 and 6, each end of the ring 6 at the transverse split is provided centrally thereof with a semicircular, inwardly tapered notch 9, the two notches being adapted to receive the conical head 10 of an expanding bolt 11. When the supporting ring 6 is in place within the tire, the large end of the head 10 of the bolt extends outside the rim into the recess 2 of the tire and the threaded end thereof extends through an aperture 12 that is formed in the base of a channel bridge plate 13 which extends across the split on the inner face of the ring. A nut 14 is disposed on the threaded end of the bolt 11 and engages the inner face of the bridge plate. When the nut 14 is tightened against the plate 13 the conical head 10 is drawn into the notches 9 and wedges the ends of the ring 6 apart, expanding the ring into tight engagement with the side rings 3 and forming therewith a solid construction.

The ring 6 when thus expanded into interlocking engagement with the side rings 3 virtually forms therewith a cushion tire carrying rim which may be easily mounted on or removed from the usual metal felly of a wheel.

Figure 8:
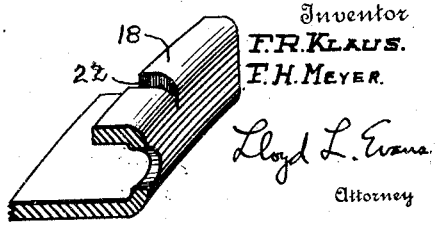
Fig. 8 is a perspective view, shown partially in section with parts broken away, of a portion of the felly upon which the cushion tire is adapted to be mounted.

In order to so attach and remove the rim, we have found it very desirable to provide clamps 15 which are preferably secured to the ring 6. The clamps are preferably provided with an upstanding lug 15ª which may be inserted in apertures provided in the channel portion 16 of the ring 6. The outer ends of lugs 15ª may be spread or riveted over to secure the clamps to the ring. The wheel felly is provided with the usual tapered side flange 17 to receive a correspondingly inclined portion of the ring 6. The felly is also provided at its outer side with an inturned flange 18 which is adapted to receive the bottom of the channel portion 16. Each clamp 15 is provided with a depending leg 19 which is apertured as at 20 to receive a fastening bolt 21 of the usual type. The outer flange 18 of the metal felly is preferably recessed, as shown at 22 in Figure 8, to receive the inwardly extending leg 23 of the clamp. Also, the bottom of the channel portion 16 of the ring 6 is recessed for the same purpose, whereby a driving connection between the demountable rim and felly is provided. It is of course obvious that any desired number of such clamps may be used.

By reason of the fact that the transversely split ring 6 is expanded against the rigid base rings 3 and engages the felly along the edge portions reinforced by the rings 3, it will not be distorted or otherwise damaged while in use and may be made of relatively light stock.

While we have indicated the side rings 3 as being of relatively light construction, it is obvious that these side rings may be made of a section comparable to relatively heavy base sections now commonly used for the cushion or solid rubber tires which are pressed on to the wheels and thus our invention enables one to use such relatively heavy side rings if desired and yet obtain all the advantages of demountability.

Preferably the side sections 3 are designed with ribs or corrugations and these may be simply small ribs cold-rolled on the surface of the sections to which the rubber tire is cured.

It will thus be seen that the various sections of the rims, when assembled, are so connected that relative radial, relative lateral and relative circumferential movement is prevented, the relative radial movement being prevented by the side sections and means securing the rim to the wheel. Relative lateral and circumferential movement is prevented by the interlocking engagement between the spacing ring and the side sections.

Furthermore, it is to be understood that the particular forms of cushion tire structures shown and described, and the particular procedure set forth, are presented for purposes of explanation and illustration and that various modifications of said cushion tire structures and procedure can be made without departing from our invention as defined in the appended claims.

What we claim is:

1. The combination with a cushion tire having a central, circumferential recess in its base, and flanged base rings secured thereto on opposite sides of the recess, said rings being widely spaced and respectively having a materially lesser diameter at their inner edges than at their outer edges, of a transversely split, annular ring of uniform thickness having external grooves to receive the inner portions of the base rings, and means solely carried by the split ring for expanding said ring into rigid engagement with said base rings.

2. The combination with a cushion tire having an inner, circumferential recess and rigid base rings secured thereto on opposite sides of the recess, of a transversely split, supporting ring having a locking engagement with the inner sides of the base rings, a bolt having a wedge-shaped head disposed between the ends of the ring at the split and extending into the recess, a channel-shaped bridge plate extending across the split on the inner side of the ring and having an opening through which the bolt extends, and a nut on the bolt adapted to be tightened against the inner side of the plate.

3. The combination with a cushion tire secured to a pair of widely spaced annular, rigid, base rings, of a supporting ring of uniform thickness underlying said base rings and having a rigid, locking engagement therewith throughout its periphery, said supporting ring having a depending, channel-shaped folded portion and a plurality of apertured clamps secured to said channel-shaped portion for removably securing said structure to a wheel body.

In testimony whereof we hereunto affix our signatures.

FRED R. KLAUS.
FRANK H. MEYER.